United States Patent
Yoon

(10) Patent No.: US 9,420,531 B2
(45) Date of Patent: Aug. 16, 2016

(54) POWER SAVING METHOD OF PORTABLE TERMINAL AND PORTABLE TERMINAL SUPPORTING THE SAME

(71) Applicant: Samsung Electronics Co., Ltd, Gyeonggi-do (KR)

(72) Inventor: Jung Il Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/971,726

(22) Filed: Aug. 20, 2013

(65) Prior Publication Data

US 2013/0336187 A1    Dec. 19, 2013

Related U.S. Application Data

(63) Continuation of application No. 12/657,104, filed on Jan. 13, 2010, now Pat. No. 8,514,759.

(30) Foreign Application Priority Data

Jan. 15, 2009    (KR) ........................ 10-2009-0003314

(51) Int. Cl.
*H04W 52/02*    (2009.01)
*H04W 48/16*    (2009.01)

(52) U.S. Cl.
CPC ...... *H04W 52/0209* (2013.01); *H04W 52/0274* (2013.01); *H04W 48/16* (2013.01); *Y02B 60/50* (2013.01)

(58) Field of Classification Search
CPC .................... H04W 52/0209; H04W 52/0274; H04W 48/16; Y02B 60/50
USPC .......................................... 370/311, 328, 338
See application file for complete search history.

(56) References Cited

U.S. PATENT DOCUMENTS

| | | | |
|---|---|---|---|
| 6,128,104 A | 10/2000 | Okabe et al. | |
| 7,340,615 B2 * | 3/2008 | Krantz et al. | 713/300 |
| 7,916,687 B2 | 3/2011 | Deshpande et al. | |
| 7,965,675 B2 | 6/2011 | Rahim | |
| 8,060,161 B2 * | 11/2011 | Kwak | 455/575.4 |
| 2004/0153676 A1 * | 8/2004 | Krantz et al. | 713/300 |
| 2004/0201583 A1 * | 10/2004 | Burroughes et al. | 345/211 |
| 2007/0060125 A1 | 3/2007 | Rahim | |

(Continued)

FOREIGN PATENT DOCUMENTS

| | | |
|---|---|---|
| JP | 2007-221628 A | 8/2007 |
| KR | 20080045152 A | 5/2008 |

OTHER PUBLICATIONS

Notification of Preliminary Rejection dated Jan. 14, 2015 in connection with Korean Patent Application No. 10-2009-0003314; 11 pages.

(Continued)

*Primary Examiner* — Mohammad Anwar

(57) ABSTRACT

A Wi-Fi module provided in the portable terminal is controlled in such a manner that it is turned on or turned off according to a type setting information item including a setup value defining at least one of: a turn-on time interval of the Wi-Fi module, a turn-off time interval of the Wi-Fi module, and a frequency scanning period of the Wi-Fi module in the turn-on status, and scanning is executed according to the set frequency scanning period in the turn-on status.

19 Claims, 5 Drawing Sheets

(56) References Cited

U.S. PATENT DOCUMENTS

2007/0165593 A1* 7/2007 Hundal et al. ............... 370/349
2007/0211745 A1* 9/2007 Deshpande et al. ......... 370/432

OTHER PUBLICATIONS

Decision of Patent dated Jun. 30, 2015 in connection with Korean Patent Application No. 10-2009-0003314; 7 pages.

* cited by examiner

POWER SAVING METHOD OF PORTABLE TERMINAL AND PORTABLE TERMINAL SUPPORTING THE SAME

This application is a continuation of U.S. patent application Ser. No. 12/657,104, filed Jan. 13, 2010, entitled "POWER SAVING METHOD OF PORTABLE TERMINAL AND PORTABLE TERMINAL SUPPORTING THE SAME", which claims priority to an application entitled "POWER SAVING METHOD OF PORTABLE TERMINAL AND PORTABLE TERMINAL SUPPORTING THE SAME" filed in the Korean Intellectual Property Office on Jan. 15, 2009 and assigned Serial No. 10-2009-0003314, the contents of which are incorporated herein by reference.

TECHNICAL FIELD OF THE INVENTION

The present invention relates generally to a portable terminal and, more particularly, to a power saving method of a portable terminal with a Wi-Fi module, wherein in the portable terminal, the a control is made in such a manner that the turn-on time interval and turn-off time interval of the Wi-Fi module can be adjusted according to user's setting, so that the power consumed by the Wi-Fi module can be saved. The present invention also relates to a portable terminal supporting the power saving method.

BACKGROUND OF THE INVENTION

IEEE 802.11 defines various technical standards so that devices are capable of accessing a wired network through an access point (AP) The IEEE 802.11 is a standard for technologies employed in a computer wireless network for a local area, so-called wireless LAN Wi-Fi (WLAN Wi-Fi).

Meanwhile, a portable terminal includes a mobile communication module for using a mobile communication system, and is capable of giving support for forming a communication channel with another portable terminal on the basis of the mobile communication system. In addition, the portable terminal may support a function for accessing a wired network by adding a Wi-Fi module for supporting the Wi-Fi.

In order to provide the mobile communication module in a basic function, the above-mentioned portable terminal continuously supplies power to the mobile communication module. In addition, the portable terminal gives support in such a manner that the user can assess a wired network by supplying power to the Wi-Fi module.

However, since the portable terminal supplies power to both of the mobile communication module and the Wi-Fi module, there is a problem in that power is rapidly consumed.

SUMMARY OF THE INVENTION

To address the above-discussed deficiencies of the prior art, it is a primary object to provide a method of saving power for a portable terminal with a Wi-Fi module by controlling power supply in such a manner that the portable terminal supplies power to the Wi-Fi module during the time interval of practically using the Wi-Fi module, and cuts off the power supplied to the Wi-Fi module during the other time interval, and a portable terminal supporting the power saving method.

In accordance with an aspect of the present invention, there is provided a method of saving power for a portable terminal with a Wi-Fi module. The method includes: confirming at least one type setting information item having a setup value for defining at least one of a turn-off time interval of the Wi-Fi module, a turn-on time interval of the Wi-Fi module, and a frequency scanning period of the Wi-Fi module in the turn-on status; and controlling the module by performing at least one of the turn-off control of the Wi-Fi module, the turn-on control of the Wi-Fi module, and the frequency scanning period adjusting control of the Wi-Fi module in the turn-on status module in accordance with the confirmed type-setting information item.

In accordance with another aspect of the present invention, there is provided a portable terminal with a Wi-Fi module, comprising: a storage unit that can store at least one type setting information item, each of which includes a setup value for defining at least one of a turn-off time interval of the Wi-Fi module, a turn-on time interval of the Wi-Fi module, and a frequency scanning period of the Wi-Fi module in the turn-on status; and a control unit that can control the module adjust at least one of the turn-off time interval, the turn-on time interval, and the frequency scanning period of the Wi-Fi module in the turn-on status, based on the type-setting information item.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

Figure 1:
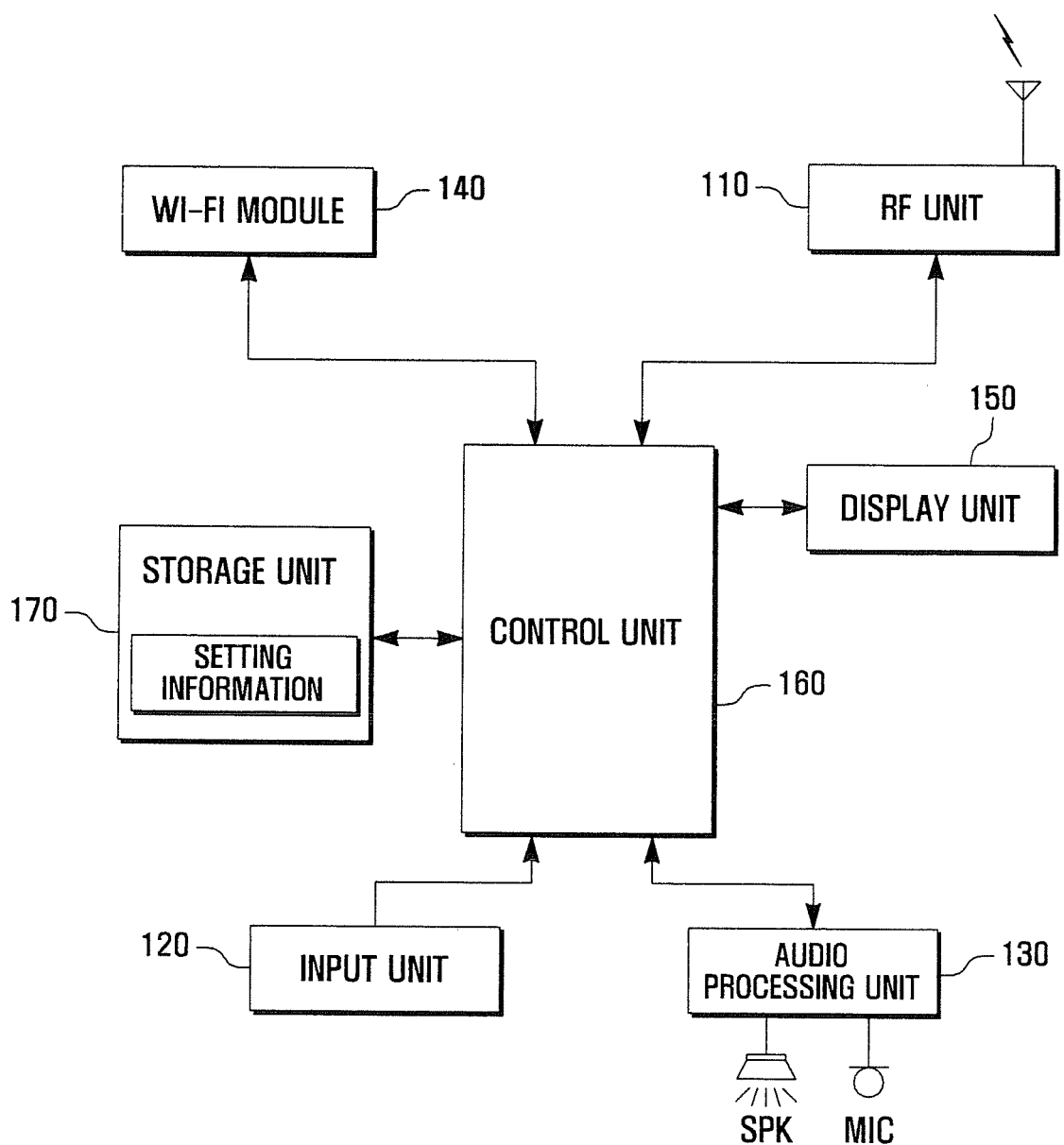
FIG. 1 illustrates the construction of a portable terminal according to an embodiment of the present invention.

Referring to FIG. 1, the inventive portable terminal 100 may include a radio frequency (RF) unit 110, an input unit 120, an audio processing unit 130, a Wi-Fi module 140, a display unit 150, a storage unit 170, and a control unit 160.

The inventive portable terminal 100 with these components makes a control in such a manner that the Wi-Fi module 140 is turned on or turned off according to setup information defining a turn-on time interval of the Wi-Fi module 140 or a turn-off time interval of the Wi-Fi module 140, and a scanning period of the Wi-Fi module 140, which are set by a user, so that power saving can be supported, and makes a control in such a manner that the scanning period for accessing an AP (Accessing Point) can be adjusted on the basis of the setup information even in the turn-on status, whereby the power consumption caused by the Wi-Fi module 140 can be reduced. Each of the components will be described below.

The RF unit 110 is a communication module for supporting the mobile communication service of the portable terminal 100. That is, the RF unit 110 may be a GSM communication module, a CDMA communication module, or the like, depending on the mobile communication service type. Such an RF unit 110 forms communication channels with a mobile communication system. For this purpose, the RF unit may include an RF transmission unit for up-conversion of frequency of transmitted signals and amplification of the transmitted signals, and an RF reception unit for low noise amplification of received signals and down-conversion of the frequency of the received signals. The inventive RF unit 110 may be supplied with power and maintained in the turn-on status regardless whether the Wi-Fi module 140 is turned-on or turned-off.

The input unit 120 includes a plurality of input keys and function keys for receiving input numerical or character information and setting various functions. The function keys may include direction, side and shortcut keys. In addition, the input unit 120 produces and transmits key signals associated with user's setting and functional control of the portable terminal 100, to the control unit 160. In particular, the inventive input unit 120 may produce an input signal that can select at least one setup information item defining a time interval for activating the Wi-Fi module 140, an input signal that can adjust time information included in the setup information item, and an input signal that can access a wired network on the basis of the activated Wi-Fi module 140, and may transmit the input signals to the control unit 160.

The audio processing unit 130 may include a speaker SPK that can output audio signals transmitted from the control unit 160, and a microphone MIC for collecting audio signals according to the activation of a specific application program. Such an audio processing unit 130 may output audio signals received from the RF unit 110 when the RF unit 110 is activated, and output audio signals received from the Wi-Fi module 140 when the Wi-Fi module 140 is activated. In particular, the inventive audio processing unit 130 may output an alarm for informing of the turning-on or turning-off of the Wi-Fi module 140 through the speaker SPK when the Wi-Fi module 140 is turned-off or turned-on according to the setup information item under the control of the control unit 160.

The Wi-Fi module 140 forms a communication channel for supporting respective categorized access services with the AP 200, and executes required data transmission under the control of the control unit 160. In particular, the inventive Wi-Fi module 140 is turned on or turned off according to the setup information item stored in the storage unit 170, and the scanning period may be adjusted in the turn-on status. This will be described in more detail below together with the description of the set information item.

The display unit 150 displays information input by the user or supplied to the user, including various menus of the portable terminal 100. That is, the display unit 150 may provide various screens, for example, a standby screen, a menu screen, a message preparing screen, a calling screen or the like according to the use of the portable terminal 100. In particular, the inventive display unit 150 may output an AP accessing screen according to the activation of the Wi-Fi module 140, and a screen including a web page or the like received from a server through the AP. In addition, the display unit 150 may output a setting window, through which the turn-on and turn-off time intervals of the Wi-Fi module 140 can be defined. Meanwhile, the display unit 150 may be formed from an LCD (Liquid Crystal Display), an OLED (Organic Light Emitted Diode), and the like. If the display unit 150 is formed in a touch screen type, the display unit may be included in the input means. If the display unit 150 is formed in the touch screen type, a display panel and touch sensors arranged on the display panel may be provided. In addition, the portable terminal 100 may provide various menu screens executed on the basis of the touch screen as the display unit 150 supports the touch screen.

The storage unit 170 may be stored with an application program for reproducing various stored files, an application for storing a key map or a menu map for operating the touch screen, including application programs required for functional actions according to the embodiments of the present invention. Here, the key map and the menu map may take various forms. That is, the key map may be a keyboard map, a 3*4 key map or a QWERTY key map, or the key map may be a control key map for controlling an application program which is currently activated. In addition, the menu map may be a menu map for controlling the operation of an application program which is currently activated, or a menu map which includes various menus provided by the portable terminal in an itemized form. The storage unit 170 may include a program area and a data area.

The program area may be stored with an OS (Operating System) for booting the portable terminal 100 and operating each of the above-mentioned components, and application programs for reproducing various files, such as an MP3 application programs for reproducing music, an image output program for reproducing photographs and the like, and a moving image reproducing application program. In particular, the inventive program area may be stored with an application program for operating the RF unit 110 for supporting the data transmission of the portable terminal 110, and an application program for operating the Wi-Fi module 140. In addition, the program area may be stored with a Wi-Fi module power control program for controlling the Wi-Fi module to be turned on or turned off according to the setup information item. The Wi-Fi module power control program may turn on or turn off the Wi-Fi module 140, or adjust the scanning period in the turn-on status according to the setup information item set by the user.

The data area is an area for storing data produced as the portable terminal 100 is used and various contents may be stored in the data area. In addition, if the display unit 150 is implemented by a touch screen, the data area may be stored with user inputs which are input through the touch screen. In particular, the inventive data area is stored with setup at least one information item. The setup information item includes an information item regarding the adjustment of the turn-on and turn-off time intervals 140, and the scanning period of the Wi-Fi module. In particular, the setup information item may include various type-setting information items so as to allow a user to more easily control the power of the Wi-Fi module 140. For example, the set information items may include three type-setting information items. A first type-setting information item includes information set to render the Wi-Fi module 140 to be turned off during a time interval set by the user, and to be turned on during the other time interval. A second type-setting information item includes information set to extend the scanning period in the turn-on status of the Wi-Fi module 140. The Wi-Fi module 140 executes a frequency scanning action periodically so as to access the AP, wherein it is possible to reduce the number of frequency scanning actions by extending the frequency scanning period if the Wi-Fi module 140 is operated on the basis of the second type-setting information item. A third type-setting information item allows the Wi-Fi module 140 to be operated together with the operation of the RF unit 110, wherein the third type-setting information item includes information set to render the Wi-Fi module 140 to maintain the turn-on status while the power of the portable terminal is maintained, and to be operated in a frequency scanning period which is set as default. That is, the third type-setting information item can include a setup value set to render the Wi-Fi module 140 to be maintained in the turn-on status. Here, the second type-setting information item can be selected simultaneously with the first type-setting information item or the third type-setting information item.

Figure 2:
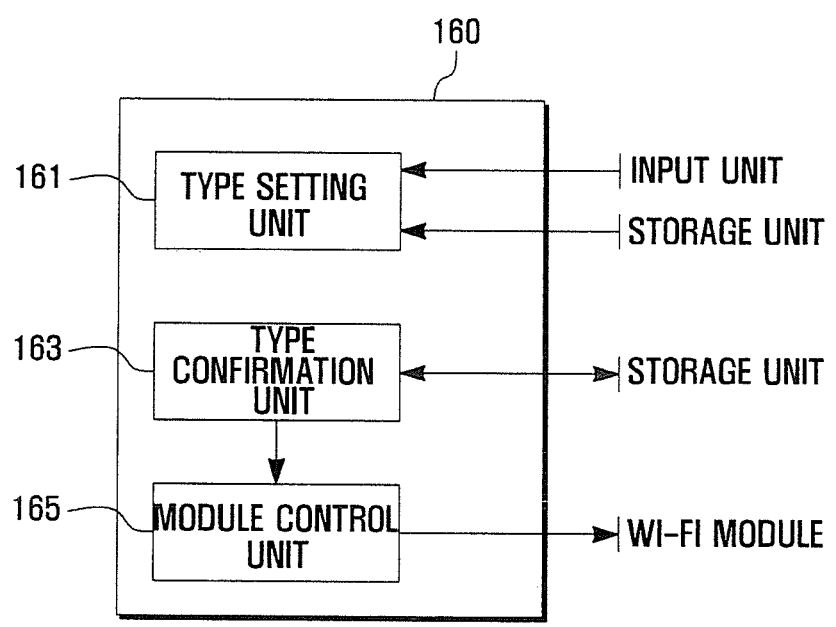
FIG. 2 illustrates the construction of the control unit of FIG. 1 in more detail.

The control unit 160 controls the power supply for each of the components of the portable terminal 100, thereby supporting the initialization processes thereof, and after the initialization processes are completed, controls the turn-on and turn-off time intervals of the Wi-Fi module 140 according to a user's request. For this purpose, the inventive control unit 160 may include a type setting unit 161, a type confirmation unit 163, and a module control unit 165, as shown in FIG. 2.

The type-setting unit 161 makes a control in such a manner that a setting window is output on the display unit 150 so that setup information items stored in the storage unit 170 can be set. In addition, the type-setting unit 161 may change setup values for individual type-setting information items according to an input signal input from the input unit 120. For example, in the case of the first type-setting information item, the type setting unit 161 may define the turn-off time interval of the Wi-Fi module 140 according to an input signal input from the input unit 120. That is, if the user produces an input signal for setting the turn-off time interval from 10:00 PM to 9:00 AM, the type-setting unit 160 makes a control in such a manner that the setup values of the first type-setting information item are changed according to the input signal. In addition, the type-setting unit 160 may change the setup values of the first type-setting information item according to the alarm setting information of the portable terminal 100. For example, it is assumed that the turn-off time interval is set from 10:00 PM to 7:00 AM and the morning alarm of the portable terminal is set to 7:00 AM. Then, if the alarm setting information is selected as an option for the application of the turn-off time interval of the Wi-Fi module 140, the type setting unit 161 collects the alarm information and makes a control to activate the Wi-Fi module 140 at a predetermined length of time, such as five minutes before the set alarm time. Then, the control unit 160 may make a control in such a manner that frequency scanning is executed on the basis of the activated Wi-Fi module 140 so as to search for the AP. For this purpose, the type-setting unit 161 may output an option menu for an alarm setting application.

In addition, the type-setting unit 161 can give support to adjust the setup value of the second set information, i.e., the frequency scanning period. For example, if the setup value of the frequency scanning period of the second type-setting information item is set to '1 ms', the type-setting unit 161 can give support to adjust the value to '10 ms,' '20 ms' . . . . In addition, the second type-setting information item can give support to designate the time interval as well as the frequency scanning period. That is, the second type-setting information item may include a setup value for setting the scanning to be executed according to the first scanning period in the first time interval, and a setup value for setting the scanning to be executed according to the second scanning period in the second time interval. Consequently, the portable terminal user may set the portable terminal to have a relatively short scanning period in a time interval during which the user usually moves while carrying the portable terminal, and may set the portable terminal to have a relatively long frequency scanning period in a time interval during which the user usually remains within a fixed area without moving. The portable terminal user may set the frequency scanning period in the opposite sense for individual time intervals or may set the frequency scanning period optionally.

In addition, the type-setting unit 161 can give support to set the second type-setting information item together with other set information, i.e. the second type-setting information item and third type-setting information item. That is, the portable terminal user can set the first type-setting information item and the second type-setting information item in unison, or set the third type-setting information item and the second type-setting information item in unison.

The type confirmation unit 163 can confirm which type-setting information item is the information set by the type-setting unit, and provide the information according to the set information to the module control unit 165. That is, if the portable terminal user selects the first type-setting information item, the type confirmation unit 163 can transfer the information concerning turn-on and turn-off time interval of the Wi-Fi module 140 to the module control unit 165. In addition, if the portable terminal user sets two type-setting information items in unison, the type confirmation unit 163 can confirm and transfer the information for the two type-setting information items to the module control unit 165

The module control unit 165 controls the turn-on and turn-off time intervals of the Wi-Fi module 140 on the basis of the information transferred by the type confirmation unit 163 and the time information of the portable terminal, and when the second type-setting information item is also set, the module control unit 165 can adjust the frequency scanning period of the Wi-Fi module 140 activated according to the second type-setting information item. For example, it is assumed that the first type-setting information item defines that the Wi-Fi module 140 is turned off from 10:00 PM to 8:00 AM and turned on in the other time interval, and the second type-setting information item defines the frequency scanning period as 20 ms. Then, upon receiving the first type-setting information item and the second type-setting information item from the type confirmation unit 163, the module control unit 165 make a control in such a manner that the Wi-Fi module is turned off from 10:00 PM to 8:00 AM. In addition, the module control unit 165 makes a control in such a manner that the Wi-Fi module 140 is turned on and the frequency scanning period is adjusted to 20 ms. Furthermore, the module control unit 165 may make a control in such a manner that the Wi-Fi module's turn-on/turn-off and frequency scanning period according to the turn-on and turn-off time intervals of the Wi-Fi module are adjusted according to the setup values of the individual type-setting information items set by the type setting unit 165.

Figure 3A:
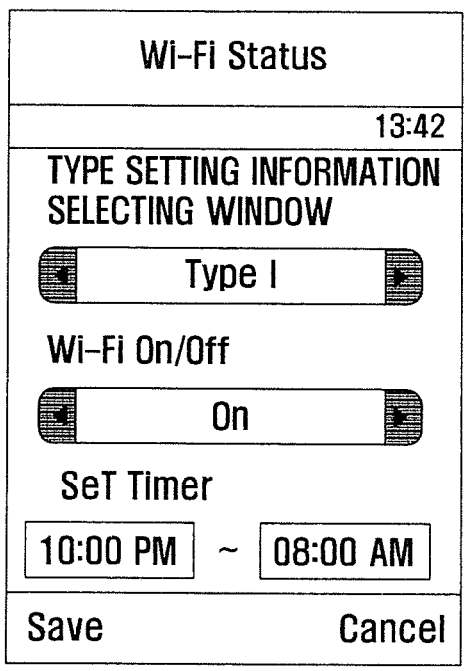
FIGS. 3A through 3C illustrate screen interfaces for inputting and displaying the inventive type-setting information by way of an example.
Figure 3B:
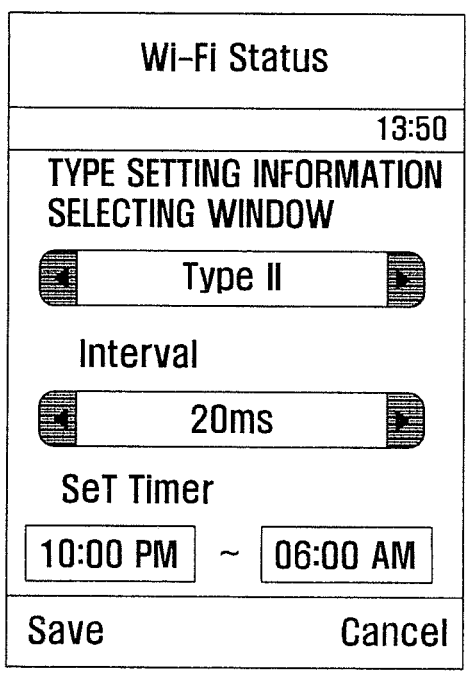
Figure 3C:
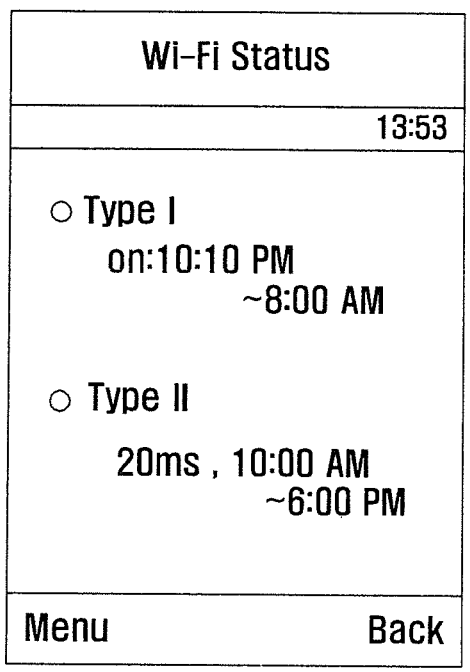

FIGS. 3A through 3C show a setting window for adjusting turn-on and turn-off time intervals of the Wi-Fi module 140 according to an embodiment of the present invention, i.e., an example of a screen for setting the first type-setting information item.

Referring to FIG. 3A, the inventive display unit may include a type setting information item selecting window, a Wi-Fi on/off input window for selecting a turn-on time interval or a turn-off time interval of the Wi-Fi module 140, and a set timer input window for setting the time interval for the turn-on time or turn-off time selected on the Wi-Fi on/off input window. According to the user's selection, "Type I" is displayed on the type setting information item selecting window, and "On" may be displayed on the Wi-Fi on/off window if the user selects turn-on among the turn-on and turn-off options. Then, the time interval value, "10:00 PM~8: AM" input by the user may be outputted on the set timer input window.

As shown in FIG. 3B, the inventive display unit may output another type setting information item, e.g. "Type II," which corresponds to the second type-setting information item, on the type setting information item selecting window. In such a case, other components, i.e., the Wi-Fi On/Off input window and the Set Timer input window may be changed to other input windows for correcting the second type-setting information item. For example, if the second type-setting information item is selected on the type setting information item selecting window, the display unit may output an interval input window for adjusting the frequency scanning period, and a set timer input window for inputting a time interval.

In addition, if type-setting information item setting is completed, the inventive display unit can display which type-setting information items are currently set. If the first type-setting information item and the second type-setting information item are described as in FIGS. 3A and 3B described above, the inventive display can output texts, through which the first type-setting information item and the second type-setting information item can be confirmed.

As described above, the portable terminal 100 according to the present embodiment may perform proper power supply needed for the operation of the Wi-Fi module 140 through the adjustment of the turn-on or turn-off time interval of the Wi-Fi module 140, or a frequency scanning period of the Wi-Fi module 140 in the turn-on time interval, whereby it is possible to reduce the power consumption caused by the Wi-Fi module 140.

In the above, a portable terminal and a screen interface according to an embodiment of the present invention have been described by way of an example. Below, a power saving method for a portable terminal according to an embodiment of the present invention will be described with reference to the accompanying drawings.

Figure 4:
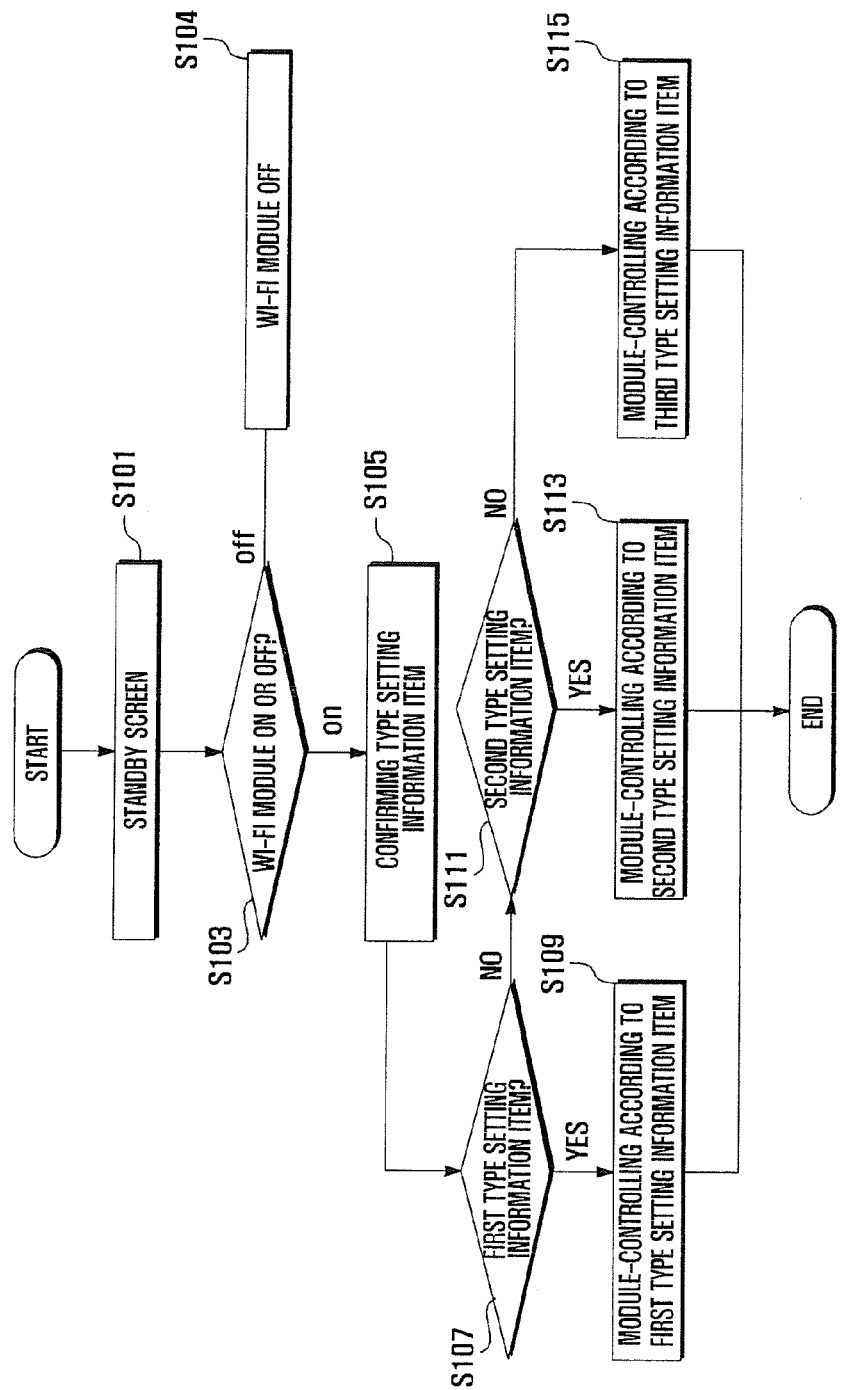
FIG. 4 illustrates a power saving method for a portable terminal according to an embodiment of the present invention.

FIG. 4 illustrates an example of a power saving method for a portable terminal according to an embodiment of the present invention.

Referring to FIG. 4, according to the inventive power saving method, if power is supplied to the portable terminal, the control unit can firstly initialize each component of the portable terminal and execute booting, using the supplied power. Then, if the booting is completed, the control unit makes a control to output a previously set standby screen as in step S101.

Then, the control unit confirms whether the Wi-Fi module is turned on or turned off in step S103. At this time, if a turn-off command for the Wi-Fi module is transferred to the input unit, the control unit proceeds to step S104 so as to make a control to turn-off the Wi-Fi module. For this purpose, in order to turn-off the Wi-Fi module, the portable terminal user may select the Wi-Fi module in the menu items and make a control to generate an input signal for instructing of the turning-off of the Wi-Fi module.

Meanwhile, if the Wi-Fi module is turned on in the step S103, the control unit proceeds to step S105 so as to confirm a type-setting information item. Here, individual setup values included in the type-setting information item can be adjusted by the user as described above. If the user executes storage after adjusting the type-setting information item, the type-setting information item is stored in the storage unit. The control unit searches the storage unit so as to confirm the type-setting information item, and to readout the currently set type-setting information item.

In this manner, the control unit can confirm whether the currently set type-setting information item is the first type-setting information item or not in step S107. If the currently set type-setting information item is the first type-setting information item, the control unit proceeds to step S109 and executes a module control according to the first type-setting information item. That is, the control unit can confirm the setup values included in the first type-setting information item and compare the time indicated by the corresponding setup value with the current time. In addition, the control unit can confirm whether the current time corresponds to the turn-on time or turn-off time of the Wi-Fi module. If the current time corresponds to the turn-on time, the control unit makes a control for maintaining the operation of the Wi-Fi module, and if the current time corresponds to the turn-off time, the control unit makes a control for turning off the Wi-Fi module.

Meanwhile, if the currently set type information setting item is not the first type-setting information item in the step S107, the control unit proceeds to step S111 and confirms whether the currently set type-setting information item is the second type-setting information or not. If the currently set type-setting information item is the second type-setting information item, the control unit proceeds to step S113 and executes a module control according to the second type-setting information item. That is, the control unit can confirm the setup values included in the second type-setting information item, and adjust the frequency scanning period according to the set frequency scanning period. At this time, if only the frequency scanning period is set in the second type-setting information item, the control unit can make a control so that scanning is executed according to the set frequency scanning period while the Wi-Fi module is in a turn-on state. In addition, if the frequency scanning period and the time interval are included in the second type-setting information item, the control unit can make a control so that within the set time interval, an AP is searched for according to the frequency scanning period, and in the other time interval, the AP is searched for according to the frequency scanning period set as default. If information, which has set a frequency scanning period according the entirety or individual parts of a 24 hour day or according to each of discrete time intervals, is included in the second type-setting information item, the control unit can make a control so that the AP is searched for according to the set frequency scanning period during the set time interval.

Meanwhile, if the currently set type-setting information item is not the second type-setting information item, the control unit proceeds to step S115 and executes a module control S111 according to the third type-setting information item. That is, the control unit can make a control so that the Wi-Fi module is maintained in a turned on state, and the Wi-Fi module is operated according to the frequency scanning period set as a default.

Although the present invention has been described above in that three type-setting information items are included in the present invention, the present invention may additionally include various type-setting information items, so that the Wi-Fi module can be controlled to be automatically turned on or turned off with reference to the set type-setting information item, and controlled to be operated according to the set frequency scanning period when it is turned on.

In addition, although it has been described that the Wi-Fi module is operated according to one set type-setting information item, if a plurality of type-setting information items are set, it is possible to control the operation of the Wi-Fi module compositely according to corresponding type-setting information items. Furthermore, if an alarm is set, the control unit can adjust a turn-off time in the first type-setting information item. That is, if the Wi-Fi module is turned off in the alarm setting information, the control unit can make a control so that the Wi-Fi module is turned on, and a frequency scanning operation for AP access is executed. For this purpose, the control unit can provide an option menu for confirming whether an alarm setting and the first type-setting information item is applied in unison. Consequently, the alarm setting can be used as information for adjusting the turn-off time interval of the first type-setting information item. In other words, if the Wi-Fi module is set to be turned off from 10:00 PM to 8:00 AM, and the alarm is set to 7:00 AM, the control unit may adjust the turn-off time interval to be from 10:00 PM to 7:00 AM.

According to the inventive power saving method and portable terminal with a Wi-Fi module, the time interval for supplying power is determined depending on the desired settings of the Wi-Fi module set by a user, whereby it is possible to reduce power consumption caused by the Wi-Fi module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal with a Wi-Fi module, the portable terminal comprising:
   an input unit configured to produce an input signal that adjusts at least one of a turn-off time interval of the Wi-Fi module or a turn-on time interval of the Wi-Fi module;
   a storage unit configured to store at least one type-setting information item and alarm setting information defined to output an alarm at a set time, wherein each of the type-setting information items includes an adjustable setup value to the defined at least one of the turn-off time interval of the Wi-Fi module or the turn-on time interval of the Wi-Fi module by the input unit; and
   a control unit configured to control the Wi-Fi module to adjust the at least one of the turn-off time interval or the turn-on time interval based on the at least one type-setting information item,
   wherein the Wi-Fi module is turned on, if the Wi-Fi module is turned off at the set time for outputting alarm.

2. The portable terminal as claimed in claim 1, wherein the at least one type-setting information item comprises at least one of:
   a first type-setting information item including a setup value defining the at least one of the turn-off time interval or the turn-on time interval of the Wi-Fi module; or
   a second type-setting information item including a setup value defining that the Wi-Fi module is maintained in a turned on state while power is supplied to the portable terminal.

3. The portable terminal as claimed in claim 1, wherein the input unit is further configured to produce at least one of an input signal that selects the at least one type-setting information item defining an item interval to activate the Wi-Fi module and an input signal that accesses a wired network based on the Wi-Fi module, and
   wherein the at least one type-setting information item is changed in response to the input signal.

4. The portable terminal as claimed in claim 3, further comprising a display unit configured to output an input window to designate the setup value included in the type setting information item.

5. The portable terminal as claimed in claim 4, wherein the display unit is configured to output the setup value included in the type setting information item in a text format.

6. The portable terminal as claimed in claim 1, wherein the input unit includes a plurality of input keys and function keys to receive input numerical or character information and setting one or more functions.

7. A method to save power for a portable terminal with a Wi-Fi module, the method comprising:
   changing an adjustable setup value according to an input signal that adjusts at least one of a turn-off time interval of the Wi-Fi module or a turn-on time interval of the Wi-Fi module;
   confirming a type-setting information item including the changed adjustable setup value to the adjusted at least one of the turn-off time interval of the Wi-Fi module or the turn-on time interval of the Wi-Fi module by the input signal and alarm setting information defined to output an alarm at a set time; and
   controlling the Wi-Fi module by performing at least one of a turn-off control of the Wi-Fi module or a turn-on control of the Wi-Fi module in accordance with the confirmed type-setting information item,
   wherein the Wi-Fi module is turned on, if the Wi-Fi module is turned off at the set time for outputting alarm.

8. The method as claimed in claim 7, wherein changing the adjustable setup value comprises:
   outputting an input window to designate the setup value included in the type setting information item;
   changing the setup value according to the input signal; and
   storing the type setting information item including the changed setup value.

9. The method as claimed in claim 8, wherein changing the adjustable setup value further comprises:
   selecting the type-setting information item defining an item interval to activate the Wi-Fi module; and
   accessing a wired network based on the Wi-Fi module.

10. The method as claimed in claim 7, further comprising displaying an input window to designate the setup value included in the type-setting information item.

11. The method as claimed in claim 10, wherein displaying further comprises outputting the setup value included in the type-setting information item in a text format.

12. A portable terminal with a Wi-Fi module, the portable terminal comprising:
- an input unit configured to produce an input signal that adjusts at least one of a turn-off time interval of the Wi-Fi module or a turn-on time interval of the Wi-Fi module; and
- a control unit configured to control the Wi-Fi module to adjust the at least one of the turn-off time interval or the turn-on time interval based on a type-setting information item,
- wherein the type-setting information item comprises an adjustable setup value that defined the at least one of the turn-off time interval of the Wi-Fi module or the turn-on time interval of the Wi-Fi module by the input unit, and
- wherein the Wi-Fi module is turned on if the Wi-Fi module is turned off at the set time for outputting alarm.

13. The portable terminal as claimed in claim 12, wherein the type-setting information item comprises at least one of:
- a first type-setting information item including a setup value defining the at least one of the turn-off time interval and the turn-on time interval of the Wi-Fi module; or
- a second type-setting information item including a setup value defining that the Wi-Fi module is maintained in a turned on state while power is supplied to the portable terminal.

14. The portable terminal as claimed in claim 12, wherein the input unit is further configured to produce at least one of an input signal that selects at least one type-setting information item defining an item interval to activate the Wi-Fi module, and an input signal that accesses a wired network on the basis of the Wi-Fi module, and
- wherein the at least one type-setting information item is changed in response to the input signal.

15. The portable terminal as claimed in claim 14, further comprising a display unit configured to output an input window to designate the setup value included in the type setting information item.

16. The portable terminal as claimed in claim 15, wherein the display unit is configured to output the setup value included in the type setting information item in a text format.

17. The portable terminal as claimed in claim 12, further comprising a storage unit configured to store the type-setting information item.

18. The portable terminal as claimed in claim 12, further comprising one or more speakers configured to output audio signals transmitted from the control unit or a microphone configured to collect audio signals according to an activation of a specific application program.

19. The portable terminal as claimed in claim 12, wherein the input unit includes a plurality of input keys and function keys to receive input numerical or character information and setting one or more functions.

* * * * *